United States Patent [19]
Crews, IV et al.

[11] Patent Number: 5,205,874
[45] Date of Patent: Apr. 27, 1993

[54] PROCESS OF PROTECTING METALLIC AND WOOD SURFACES USING SILICATE COMPOUNDS

[76] Inventors: Nathan C. Crews, IV, 6815 Old Clifton Rd.; Daniel A. Young, Lance A. Young, both of 6825 Old Clifton Rd. SW.; all of Port Orchard, Wash. 98366

[21] Appl. No.: 704,125

[22] Filed: May 22, 1991

Related U.S. Application Data

[63] Continuation-in-part of Ser. No. 611,140, Nov. 13, 1990, abandoned.

[51] Int. Cl.[5] .......................... B05D 3/10; C23C 28/00
[52] U.S. Cl. ...................................... 148/254; 148/256; 427/325; 427/327; 427/344; 427/397.8
[58] Field of Search ............... 148/253, 243, 254, 256, 148/269, 275, 279, 281, 282; 427/327, 325, 344, 397.7, 397.8

[56] References Cited

U.S. PATENT DOCUMENTS

| | | | |
|---|---|---|---|
| 3,658,662 | 4/1972 | Casson et al. | 205/323 |
| 3,775,266 | 11/1973 | Ikeda et al. | 205/201 |
| 3,989,550 | 11/1976 | Newhard | 148/256 |
| 4,120,702 | 10/1978 | Akerblom | 427/344 |
| 4,150,191 | 4/1979 | Karki | 427/344 |
| 4,647,479 | 3/1987 | Montes | 427/397.7 |
| 4,710,309 | 12/1987 | Miller | 252/62 |
| 4,746,555 | 5/1988 | Luckanuck | 428/35.6 |
| 4,758,281 | 7/1988 | Eckler et al. | 106/467 |
| 4,793,903 | 12/1988 | Holmquist et al. | 205/213 |
| 4,810,741 | 3/1989 | Kim | 524/405 |
| 4,908,075 | 3/1990 | Yamasoe | 148/256 |

Primary Examiner—Jay H. Woo
Assistant Examiner—James P. Mackey
Attorney, Agent, or Firm—Knobbe, Martens, Olson & Bear

[57] ABSTRACT

A process for forming a protective barrier on metallic or wood surfaces to provide protection against abrasion, corrosion, heat, and fire. The process is begun by first forming a fixed surface on the metallic or wood article. On metallic articles, the fixed surface is formed by cleaning the surface and then exposing the surface to concentrated phosphoric acid. On wood, the fixed surface is formed by thoroughly cleaning the surface with hot water and detergent only. After the fixed surface is prepared, it is then exposed to a 10-16% silicate salt for at least one minute and then allowed to dry completely at 305 degrees Fahrenheit to form a first layer of silicate salt over the fixed surface. During the drying process, a portion of the sodium silicate is converted into silicon dioxide. A plurality of sodium silicate layers are then formed over the first layer of sodium silicate. After the last layer of sodium silicate is formed, it is then exposed to concentrated phosphoric acid to form a bi-layer thereon comprised of an inner layer of sodium silicate and an outer layer of silicon dioxide. In an alternative method, each sodium silicate layer is exposed to concentrated phosphoric acid to create a plurality of bi-layers over the fixed surface.

18 Claims, 2 Drawing Sheets

PROCESS OF PROTECTING METALLIC AND WOOD SURFACES USING SILICATE COMPOUNDS

This is a continuation-in-part of copening application Ser. No. 07/611,140 filed on Nov. 13, 1990 and now abandoned.

TECHNICAL FIELD

This invention relates to processes or methods for protecting metallic and wood surfaces and, more particularly, to methods and processes in which protective barriers are formed or absorbed into such surfaces to provide protection against abrasion, corrosion, heat, and fire.

BACKGROUND ART

It is well known that the destruction of metallic and wood articles caused by abrasion, corrosion, heat and fire has a substantial economic impact in many industries. Finding methods for inhibiting these destructive forces are very important. One method uses a protective barrier or coating over the article's exposed surfaces.

There are various types of protective barriers that can be used. One type uses organic compositions, such as paints, varnishes, lacquers, and the like, that are applied directly over the surface of the article. In order to act as a protective barrier, the organic composition must be compatible with the treated surface. Also with some organic compositions, the surface must be pretreated before application so that proper bonding and adhesion occurs to the surface. For example when applying paints to aluminum or an aluminum alloy surfaces, the surfaces must be thoroughly cleaned and "roughed-up" or "pickled" so that the paint adheres to the surface. When relatively thin paints are used, however, the "roughed-up" or "pickled" underlying surface may be seen through the paint layer which may be undesirable. Also with many organic compositions, the protective barrier formed may be relatively soft and not resistant to abrasions or corrosion. Moreover, the organic compositions themselves often contain flammable ingredients which offer little or no protection against heat and fire.

Another type of protective barrier uses silicate compounds which are chemically bonded to various metallic surfaces. It is widely known, that various silicate compounds can be used to form hard, smooth surfaces that are resistant to abrasion and corrosion. In the lithographic industry, for example, Casson, Jr., et al., (U.S. Pat. No. 3,658,662) discloses lithographic plates made of aluminum or aluminum alloy material, that are silicated to provide a hard, smooth barrier between the plate's surface and the corrosive diazonium salts and other photosensitive coatings used in the lithographic process. Another advantage for using silicate compounds is their heat and fire resistant properties. Kim, (U.S. Pat. No. 4,810,741), for example, discloses an elaborate process for producing a fire-resistant, noncombustible material containing a silicate compound, sodium silicate, and other ingredients that can be used on various combustible materials.

For aluminum articles, there are two general methods used to carry out the silication process: non-electrolytic and electrolytic. With non-electrolytic processes, the aluminum surface is dipped in a silicate containing solution which, reportedly, forms a thin layer of silicate on the aluminum surface. Unfortunately, the layer of aluminum silicate is weakly bonded to the aluminum surface and only partially resistant to acids, bases, or salt water. Also, uniform results are difficult to achieve because variable factors, such as, the impurities on the metal surface, the pH of the solution, the concentration of the silicate, the temperature of the solution, to name a few, can have an impact on the results.

Electrolytic processes, on the other hand, disclosed in Casson. Jr., et al., (U.S. Pat. No. 3,658,662), are more complex and time consuming. Generally, the process uses a basic electrolyte solution of sodium silicate or other salts and aluminum which acts as an anode. Electricity is supplied between the anode and cathode which causes an aluminum silicate barrier to form on the surface of the anode. Although in Casson, Jr., et al, the inventors report that the electrolytic process forms an improved silicated barrier on aluminum, the process can not be used on non-metallic surfaces, such as wood.

A simple process of forming a protective barrier made of silicate-containing material that can be used on both metallic and wood surfaces to provide protection against abrasions, corrosion, heat and fire is highly desirable.

DISCLOSURE OF THE INVENTION

It is an object of this invention to provide a relatively simple process to protect a metallic or wood surface against abrasion, corrosion, heat and fire.

It is another object of this invention to provide such a process whereby an outer protective barrier made of various silicate compounds is formed over the metallic or wood surface.

It is a further object of this invention to provide such a process which does not use electrolysis and does not use or produce chemicals or compounds that are environmentally unsafe. These and other objects and advantages of this invention will become apparent to those skilled in the art when the accompanying description of some of the best modes contemplated for practicing the invention are read.

It is widely known that various silicate compounds when dried, form a relatively hard, smooth layer that is resistant to abrasion and corrosion. It is also known that various silicate compounds when dried, are also heat and fire resistant. What is not known heretofore, however, is a simple process for forming a protective barrier made of one or more layers of various silicate compounds over a metallic or wood surface.

The process disclosed herein forms a protective barrier comprising an outer layer of silicon dioxide over one or more inner layers of silicate salt. To form such a protective barrier, the process begins by creating a fixed surface on the metallic or wood article. The fixed surface is created by first washing the surface with detergent and hot water. With metallic articles, the surface is then exposed to a fixing acid solution which etches or chemical reacts with the surface to form a thin film layer thereon. The film layer contains binding substances, such as metallic oxide material, which enables the layer of silicate salt formed in the next step to bind to the surface. In the preferred process, the fixing acid is phosphoric acid which forms a thin film layer comprising metallic oxide and metallic ortho-phosphate material. After exposing the surface on the metallic article to the acid, excess acid or oxides, or other impurities not tightly bonded to the surface are then forcibly removed by wiping the surface with a cloth or by washing the surface with pressurized hot water. With wood articles, no further steps are needed to create a fixed surface.

After a fixed surface is created on the metallic or wood article, it is then exposed to an alkali or alkaline-earth metal silicate solution. Although various types of silicate solutions may be used in the process, in the preferred process the fixed surface is exposed to 18-33% (v/v) sodium silicate solution. After exposure, the fixed surface is dried completely at a temperature, preferrably at 302 degrees Fahrenheit or more, to form a thin layer of silicate salt over the fixed surface. During the drying step, it is postulated that a small portion of the silicate salt is converted into silicon dioxide. With wood surfaces, it is postulated that during this first exposure, the silicate salt solution is partially absorbed into the wood fibers located along the surface. The amount of silicate salt solution absorbed is dependent upon the type of wood, the porosity of the wood, and the length of exposure.

Because cracks and other imperfections can occur in the first layer of silicate salt during the process, the entire process may be repeated to form a plurality of layers of silicate salt over the lower layers of silicate salt. Each layer of silicate salt provides greater protection to the article against abrasion, corrosion, fire and heat. After the final layer of silicate salt is formed and dried, it is then exposed to a strong acidic solution. During this exposure, the final layer of silicate salt is transformed into an outer bi-layer structure comprising an inner layer of silicate salt and an outer layer of silicon dioxide. When the entire process is completed, the protective barrier comprises a plurality of inner layers of silicate salt partially converted into silicon dioxide, and an outer bi-layer comprising an inner layer of silicate salt and an outer layer of silicon dioxide.

The above stated process may be further modified by exposing each dried layer of silicate salt to a strong acid before forming a subsequent layer of silicate salt thereover. This creates a plurality of bi-layers, similar to the outer bi-layer described above, over the fixed surface which improves the protective barriers resistance to abrasion, corrosion, fire and heat. When using this alternative process, each layer of silicate salt is transformed into an inner bi-layer comprising a layer of silicate salt and an outer layer of silicon dioxide. For most applications, one inner bi-layer is formed under the outer bi-layer to provide sufficient protection. When the entire process is completed, a protective barrier is formed over the metallic or wood article to protect it against abrasion, corrosion, heat, and fire.

BEST MODE FOR CARRYING OUT THE INVENTION

The following disclosed invention is a process for protecting metallic and wood surfaces against abrasion, corrosion, heat and fire. As used herein, the term "metallic" refers to surfaces containing metallic compounds, including steel, aluminum, and metallic alloys. Also as used herein, the term "wood" refers to all types of woods or wood products. Although not every metallic, metallic alloy, wood, or wood product has been tested with the process disclosed herein, it is anticipated that the process can be used on articles made of metal such as aluminum, copper, cadmium, magnesium, nickel, silver, steel, titanium, and their related alloys, and on articles made of wood. It is anticipated that the process may also be used on articles made of other materials.

Figure 1:
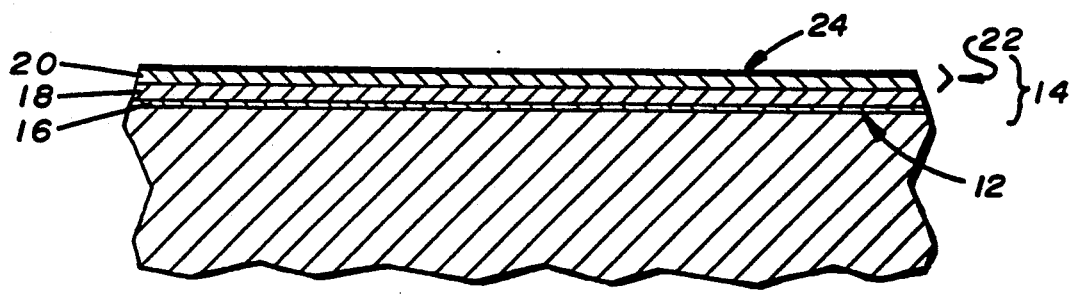
FIG. 1 is a cross-sectional view of a metallic article having a protective barrier formed thereon comprising one inner layer of silicate salt and an outer bi-layer.

As shown in FIG. 1, a process disclosed herein is used to form a protective barrier 14 on a fixed surface 12 of a metallic article 10. Using the process, the protective barrier 14 comprises an outer bi-layer structure 22 covering an inner layer of silicate salt material 18. When used to treat metallic articles 10, the process begins by first creating a fixed surface 12 on the article 10. Initially, the surface to be treated is first cleaned and dried. Although no particular method of cleaning and drying is preferred, warm water and a detergent have proven to be satisfactory. Next the surface is exposed to a fixing acid solution which etches or chemically reacts with the surface to form a thin film layer 16 thereon. The thin film layer 16 contains a binding substance, such as a metallic oxide material, which enables the layer of silicate salt formed later to bind to the surface. In the preferred process, the fixing acid solution is 20% to 25% phosphoric acid which is left on the surface for three to ten minutes. With phosphoric acid, it is postulated that it etches and chemically reacts with the surface to form a thin film layer 16 comprising metal ortho-phosphate and metal oxide salt material. Although other acids may be used as fixing acid solutions, only phosphoric acid appears to form a metallic ortho-phosphate salt that binds more tightly to the fixed surface 12 than other salts, such as metallic oxides, formed when other types of acids are used. It should also be noted, that if stronger acids are used, such as hydrochloric acid, excessive oxidation of the surface may occur. Although any method may be used to exposed the fixed surface 12 to phosphoric acid, the preferred method is carried out by completely submerging the article 10 in an acid bath. Preferably, the phosphoric acid bath is heated to 120-140 degrees Fahrenheit to speed up the reaction and to generate a more uniform appearance on the surface. For higher or lower concentrations of acid solution, however, the reaction times and temperatures may be decreased or increased accordingly.

After the film layer 16 is formed thereon, the surface is then wiped with a cloth or washed in warm water to forcibly remove any excess acid or any impurities. The impurities, generally referred to as smut material, comprise of various oxides and phosphate salts (typically copper and magnesium salts) which form on the surface. This washing step, called desmutting, is conducted for appearance value only, since the smut material does not appear to hinder the creation of or the functioning of the protective barrier. In the preferred process, desmutting is conducted by washing the film layer 16 with warm or hot water, 120-140 degrees Fahrenheit. Pressure and scrubbing action as well as other desmutting methods may also be used. The smut material is apparent by a dark grey to black color depending on the type aluminum alloy used and its oxidation state. After cleaning and rinsing, film layer 16 is then dried.

Next, the film layer 16 is exposed to an alkali-metal or alkaline-earth metal silicate solution to form the inner layer of silicate salt over the fixed surface 12. The alkali-metal silicate solution is selected from the group consisting of potassium silicate, sodium silicate, and lithium silicate. The alkaline-earth metal silicate solution is selected from the group consisting of beryllium silicate, magnesium silicate, and calcium silicate. In the preferred process the film layer 16 is exposed to 18-33% (v/v) sodium silicate solution by immersion or spraying. When used on metallic articles 10, it is postulated that during the exposure in the sodium silicate solution, the metallic ortho-phosphate or metallic oxide material found in film layer 16 chemically bonds with the sodium silicate in the solution to form the inner layer of silicate salt 18. The actual exposure time in the silicate solution varies from 1 to 10 minutes depending upon the type of article and surface treated. With smooth surfaces, for example, less exposure time is required than with rough or pitted surfaces. Also, surfaces made of aluminum or aluminum alloys require less exposure time than magnesium or magnesium alloy surfaces.

After exposing the film layer 16 to the solution of sodium silicate, the layer of silicate salt 18 is then allowed to dry completely at a sufficiently high temperature. It is important that the film layer 16 be dried completely before proceeding to the next step in the process. In the preferred process, the drying step is carried out in an oven at 302 degrees Fahrenheit or more. At this temperature, complete drying takes between 2 to 30 minutes. It has been discovered that when sodium silicate is dried at 302 degrees Fahrenheit or more, a portion of it is converted into silicon dioxide which appears to increase inner layer's 18 resistance to abrasion and corrosion. By increasing or decreasing the temperature or the drying time, the amount of conversion of sodium silicate into silicon dioxide can be increased or decreased, respectively, to create layers having different abrasion and corrosive properties.

After the inner layer 18 has dried completely, it is then exposed to the 18-33% (v/v) sodium silicate solution for one to three minutes and then dried in the same manner as above to form a second layer of silicate salt 20 over the first inner layer 18. Unlike the first exposure in sodium silicate solution used to create the inner layer 18, the length of exposure in the sodium silicate solution to form the second layer 20 is not as critical. Again, by controlling the drying temperature and the drying time, the amount of sodium silicate converted into silicon dioxide may be selectively controlled.

After the second layer 20 has dried completely, it is then exposed to an acid solution selected from the group consisting of acetic acid, boric acid, carbonic acid, hydrochloric acid, nitric acid, phosphoric acid, and sulfuric acid. During this exposure, the second layer 20 is converted into a uniform bi-layer 22. Bi-layer 22 comprises the lower portion of the second layer 20 and an outer layer of silicon dioxide 24. During the exposure in the acid solution, the acid chemically reacts with the silicate salt material in the second layer 20 to form the outer layer of silicon dioxide 24. In the preferred process, the second layer 20 is exposed to 20-25% phosphoric acid heated between 120-140 degrees. When the acid is heated to this temperature, the exposure time is between 15 to 30 seconds. If the temperature of the acid is room temperature, the exposure time is between two to seven minutes. The outer layer of silicon dioxide 24 is hard and smooth and has a uniform appearance. Because it is harder than sodium silicate, the protective barrier 14 formed with the bi-layer structure 22 is more resistant to abrasion and corrosion than single layers of sodium silicate.

Figure 2:
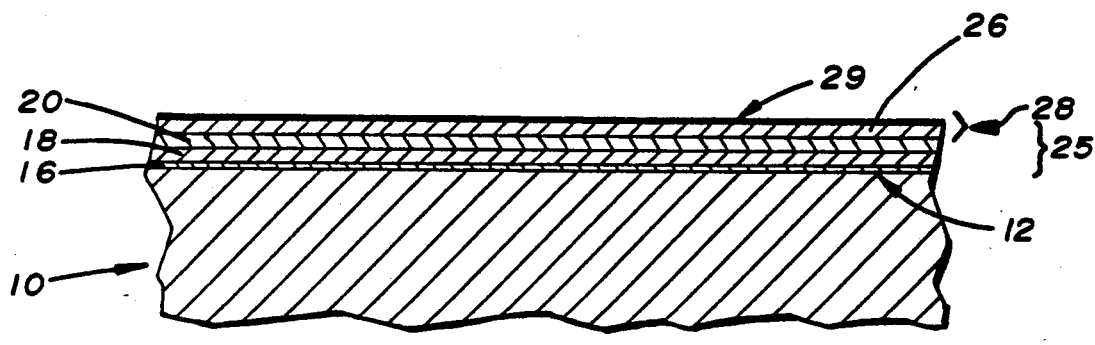
FIG. 2 is a cross-sectional view of a metallic article having a protective barrier formed thereon comprising two inner layers of silicate salt and an outer bi-layer.

As shown in FIG. 2, instead of converting the second layer of silicate salt 20 into a bi-layer structure 22, a third layer of silicate salt 26 may be formed over the second layer of silicate salt 20 to form a second protective barrier 25 which provides greater protection than protective barrier 14. In order to form the second protective barrier 25, the third layer 26 is formed using the steps cited above used to form the second layer 20. Rather than exposing the second layer 20 to phosphoric acid after drying completely, it is instead exposed to the 18-33% sodium silicate solution. After drying, the third layer of silicate salt 26 is then formed which is then exposed to 20-25% phosphoric acid to form an outer bi-layer 28. Like bi-layer 22, bi-layer 28 comprises the lower portion of the third layer 26 made of sodium silicate and a thin outer layer of silicon dioxide 29.

When the entire process is completed, a relatively smooth, hard protective barriers 14 and 25 may be formed on the surface of the article 10, comprising one or two inner layers of silicate salt 18 and 20, covered by outer bi-layers 22 or 28, respectively. The protective barriers 14 and 25 are very resistant to abrasion and corrosion due to acidic, basic and salt water action, and glass-like in appearance which may be covered with other organic compositions, such as paints, varnishes, and the like.

It has been discovered that using the above stated process, cracks or pores may be formed on the top surface of each inner layer of sodium silicate 18, 20 which may affect the overall functioning of the protective barriers 14 and 25. To eliminate this problem, it has been discovered that by exposing each lower layer of silicate salt 18 or 20 to phosphoric acid before forming a subsequent layer of silicate salt thereover, a plurality of bi-layers may be formed over the fixed surface 12.

Figure 3:
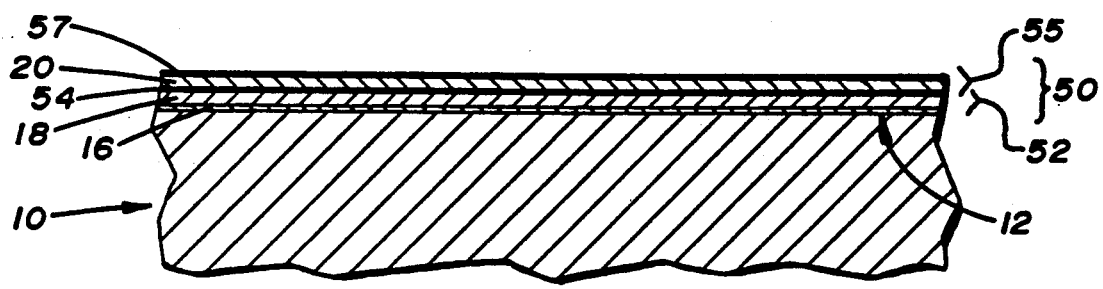
FIG. 3 is a cross-sectional view of a metallic article having a protective barrier formed thereon comprising two bi-layer.

FIG. 3, shows a third protective barrier 50 formed on the exposed surface of article 10 comprising two bi-layers 52 and 55 formed over the fixed surface 12 of article 10. Using the steps cited above to form protective barriers 14 and 25, the two bi-layer 52 and 55 are manufactured over the fixed surface 12. Film layer 16 is first formed over the fixed surface 12. An inner bi-layer 52 is then formed over the fixed surface 12 which comprises a first layer of silicate salt 18 and first layer of silicon dioxide 54. After the inner bi-layer 52 is formed, outer bi-layer 55 is formed thereover comprising second layer of silicate salt 20 and an outer layer of silicon dioxide 57. For some applications however, where additional protection is needed, additional bi-layer (not shown) may be formed over the fixed surface 12.

To form protective barrier 50 over article 10, the fixed surface 12, film layer 16 and first layer of silicate salt 18 are first formed on the article 10 using the process cited above. After the first layer 18 has dried completely and partially converted into silicon dioxide, it is then immersed in hot phosphoric acid heated to 120 to 140 degrees Fahrenheit for 15 to 30 seconds to form an inner layer of silicon dioxide 54. The inner layer 54 is similar to the outer layer 24 created when forming protective barrier 14. After cooling, the inner bi-layer 52 is then exposed to the 18-33% (v/v) sodium silicate solution for one to three minutes and dried to form a second layer of sodium silicate 20 thereover. The second layer 20 is then immersed in hot phosphoric acid for 15 to 30 seconds to form the outer layer of silicon dioxide 57 thereover. When the process is completed, inner and outer bi-layers 52 and 55, respectively are formed over the article 10.

Figure 4:
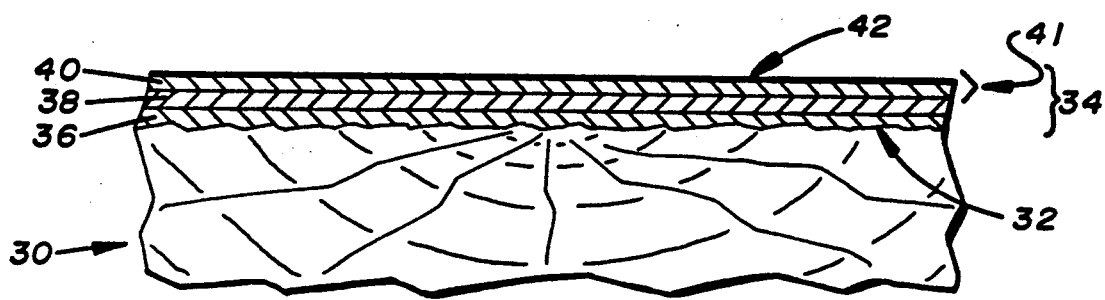
FIG. 4 is a cross-sectional view of a wood article having a protective barrier formed thereon comprising two inner layers of silicate salt and an outer bi-layer.

The process cited above may also be used on various wood surfaces to provide protection against abrasion, corrosion, heat and fire. As seen in FIG. 4, using the process a protective barrier 34 may be formed on the exposed surfaces of an article 30 made of wood. Like the process used on metallic articles, a fixed surface 32 must be first formed on the article 30 so that the protective barrier 34 will properly adhere to the article 30. The fixed surface 32 is formed by washing and rinsing it with hot or warm water and a detergent for several minutes to remove all dirt particles or foreign substances from the wood pores. Since wood is more porous than most metallic substances, washing the wood surface and removing foreign substances is more important than with metallic surfaces. Unlike the process used on metallic surfaces, no acid is used to create the fixed surface 32.

After the fixed surface 32 has been prepared, it is then exposed to one of the silicate solutions cited above used to treat the metallic article 10. In the preferred process, the fixed surface 32 is exposed to 18-33% solution of sodium silicate for one to three minutes. During this step, the sodium silicate solution is allowed to soak into the wood pores and surface cracks to form a first layer of silicate salt 36. After exposure, the first layer of sodium silicate 36 then dried at or near room temperature. Higher temperature may be used as tolerated by the wood article. It is postulated that during the exposure in sodium silicate solution, sodium solution is absorbed into the wood fibers, and as it dries it hardens and forms crystal structures between the wood fibers. It is also postulated that a small portion of the sodium silicate is converted into silicon dioxide. As a result, the first layer of silicate salt 36 is relatively hard and tightly bound to the fixed surface 32. After first layer 36 has been formed, subsequent second and third layers of silicate salt 38 and 40, respectively, are formed over the first layer 36. Like the process used to treat metallic articles, it is important that the second and third layers of silicate salt 38 and 40 be dried sufficiently to form a suitable amount of silicon dioxide before proceeding with the next step.

After the third layer of silicate salt 40 has dried, it is then exposed to an acid selected from the group used to treat a metallic article 10. In the preferred process, 20 to 25% phosphoric acid is used which is heated to 120-180 degrees Fahrenheit for 3 minutes. Like the process used to metallic articles 10, it is also postulated that the outer layer 40 is converted into a bi-layer 41 comprising an outer layer made of silicon dioxide 42 and the inner layer made of inner layer 40. After the outer layer of silicon dioxide 42 has dried, a hard, smooth protection barrier 34 is formed over the fixed surface 32 of article 30 comprising two inner layers of silicate salt 36, 38, covered by bi-layer 41. Since the protective barrier 34 is anti-corrosive, anti-abrasive, heat and fire resistant, it provides excellent protection for article 30.

Figure 5:
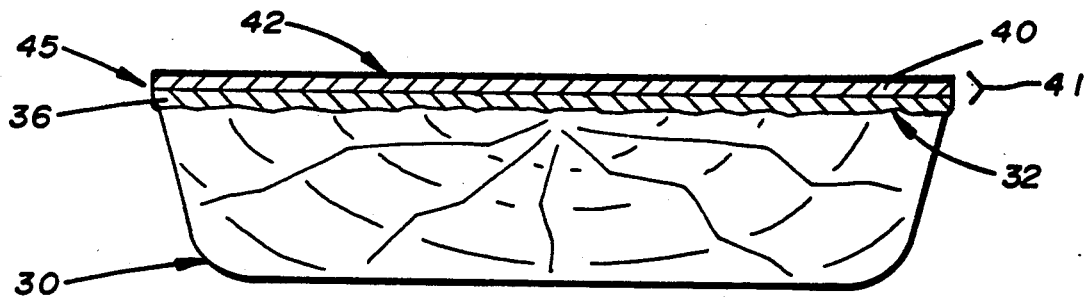
FIG. 5 is a cross-sectional view of a wood article having a protective barrier formed thereon comprising an inner layer of silicate salt and an outer bi-layer.

As shown in FIG. 5, for some applications it may be necessary to form an alternative protective barrier 45 comprising one inner layer silicate salt 36 an one outer bi-layer 41.

It is postulated that heat and fire resistance to wood surfaces is provided in part by the chemical process that occurs on the wood surface when exposed to high temperatures. When the temperature reaches or exceeds 302 degrees Fahrenheit, the first and second layers of silicate salt are chemically converted into silicon dioxide and water.

The following examples are used to illustrate the processes described herein.

EXAMPLE 1

A typical method of treating an aluminum or aluminum alloy surface using the invention is described as follows:

Two samples of aluminum panels were treated—sample 1 comprised 2024 T-3 stock while a sample 2 comprised 6061 T-6 stock. Both panels measured 3 inches (W)×10 inches (L) and 0.039 inches thick. Samples 1 and 2 were first cleaned with a detergent and water and then immersed in a 25% solution of ortho-phosphoric acid at 140 degree Fahrenheit for three minutes. The acid solution was heated to speed up the reaction and to provide a more uniform appearance. Samples 1 and 2 were then removed from the acid solution with sample 1 having a dark black smutty film and sample 2 having a light grey smutty film. The smutty films on both samples were desmutted by wiping each sample with a sponge and hot water. Once desmutted, the surface of samples 1 and 2 have a distinct silvery-white color. It is believed that this color is due to the formation of aluminum ortho-phosphate on the surface of each sample. Samples 1 and 2 were then cooled by placing them in a 60 degree Fahrenheit water bath for one minute. While wet, the samples were then placed in a 16% sodium silicate solution for one minute. Samples 1 and 2 were then removed from the sodium silicate solution and placed in an oven heated to 300 to 315 degrees Fahrenheit for approximately thirty minutes to dry. After ten minutes, samples 1 and 2 were removed from the oven and allowed to cool to room temperature. It was noted that both samples 1 and 2 have a smooth, glassy surface. Once cooled, samples 1 and 2 were returned to the 18% sodium silicate solution for three minutes. Samples 1 and 2 were then placed back into the heated oven for thirty minutes, then removed and allowed to cool to room temperature. When cooled, samples 1 and 2 were again placed in the 25% ortho-phosphoric acid for three minutes.

The surface of samples 1 and 2 appear hard, smooth, and glassy. The anti-corrosive properties of sample 1 and 2 was tested using ASTM B-117 or Mil. Specifications, C-5541. The paint adhesion property of samples 1 and 2 were also tested to Mil. Specifications, C-5541. Both samples 1 and 2, passed according to the specifications for each test.

The heat and fire resistant property of each sample was tested by comparing the burning of an untreated piece of similar aluminum with the treated samples. The treated and untreated samples were exposed to an acetylene flame which burrs between 2,000 and 2,500 degrees Fahrenheit. The untreated samples decomposed to ash in approximately 30 seconds. No pooling residue was noted. The treated aluminum samples 1 and 2, on the other hand, bent after a few seconds of exposure. After approximately, 2 minutes, 8 seconds, the aluminum material began slowly running out from between the two sides of the coating layer. At that point the test was then stopped. No aluminum ash residue were found.

EXAMPLE 2

A typical method for treating an article made of steel or alloy surface using the process described above is as follows:

Three samples of steel panels 1-3 made of 4130 steel were treated all measuring 4 inches (W) and 6 inches (L) and 0.041 inches thick. Samples 1-3 were first cleaned with a detergent and hot water to remove grease and oil and then immersed in 25% (by volume) solution of ortho-phosphoric acid maintained at 120 degrees Fahrenheit. This step provides iron ortho-phosphate to which sodium silicate may bond. The samples 1-3 were then rinsed with cool water and immersed in a 33% (by volume) sodium silicate solution maintained at 40 degrees Fahrenheit. The samples 1-3 were then dried at 305 degrees Fahrenheit for 30 minutes to form a first layer of sodium silicate partially converted into silicon dioxide on the exposed surfaces. The samples 1-3 were allowed to cool to room temperature and then immersed in a 25% (v/v) solution of ortho-phosphoric acid at 120 degrees Fahrenheit for approximately 15 seconds. This steps forms a harden, insoluble layer of silicon dioxide over the first layer of sodium silicate thereby creating a bi-layer structure over the surface. The samples 1-3 were then rinsed and cooled and reimmersed in the 33% of sodium silicate solution to form a second layer of sodium silicate over the exposed surfaces. The samples 1-3 were then dried at 305 degrees Fahrenheit for approximately 30 minutes and allowed to cool to room temperature. The samples 1-3 were then immersed in a 25% ortho-phosphoric acid solution at 120 degrees Fahrenheit for approximately 15 seconds to form a bilayer structure of sodium silicate and silicon dioxide over the samples. The samples 1-3 were then rinsed with cool water and dried at 305 degrees for 5 minutes. The samples 1-3 were tested in accordance with ASTM-B117 salt spray test and passed successfully the ½ hour, 1 hour, 2 hour, and 24 hours tests which indicates that the protective barrier formed in the process acts as a corrosion inhibitor under standard testing conditions.

EXAMPLE 3

A typical method for treating copper or a copper alloy surface using the process described herein is as follows:

A sample of copper tubing was treated. The tubing measured 12 inches (L)×¼ inches (I/D)×⅛ side thickness. The sample was first cleaned with a detergent and hot water to remove grease and oil and then immersed in the 25% solution of ortho-phosphoric acid at 120 degrees Fahrenheit. This step provides a film layer of copper ortho-phosphate on the exposed surface of the sample to which, it is postulated, that the sodium silicate can bond to. The sample was then rinsed with cool water and immersed in 33% sodium silicate solution maintained at 40 degrees Fahrenheit. The sample was then dried at 305 degrees Fahrenheit for approximately 30 minutes to form a first layer of sodium silicate over the film layer. The sample was then allowed to cool to room temperature and then immersed in a 25% ortho-phosphoric acid solution at 120 degrees Fahrenheit for 15 seconds. This step forms a insoluble layer of silicon dioxide over the first layer of sodium silicate. The sample was then rinsed with cool water and re-immersed in 33% sodium silicate solution to form a second layer of sodium silicate over the surface. The sample was then dried at 305 degrees Fahrenheit for approximately 30 minutes and allowed to cool to room temperature. The sample was then immersed in the 25% ortho-phosphoric acid solution at 120 degrees Fahrenheit for approximately 15 seconds to form an outer layer of silicon dioxide over the second layer of sodium silicate. The sample was then rinsed with cool water and dried at 305 degrees for 5 minutes. The samples 1-3 were tested in accordance with ASTM-B117 salt spray test and passed successfully the 48 hour test indicating that the protective barrier formed in the process acts as a corrosion inhibitor under standard testing conditions.

EXAMPLE 4

A typical method of treating a wood surface using the invention is described as follows:

A wood sample made of pine is first cut measuring 2 inches (W)×4 inches (L)×6 inches (H). A 20% solution of sodium silicate is then poured into a container measuring 18 inches (H)×6 inches diameter. The container has an air valve, (also known as a "Shrader" valve) and a sealing lid so that pressure could be held inside the container when closed. The wood sample is then placed into the container filled with the sodium silicate solution. The container was then closed and sealed tight. An air hose was connected to the air valve and air was forced into the container to create an internal pressure of approximately 70 psi. The wood sample was remained in the solution under pressure for ten minutes and then removed and allowed to dry for two hours at 90 degrees Fahrenheit. When the wood sample was dry, the it was returned to the sodium silicate solution and placed under pressure as described above. The wood sample was then dried for two hours at 90 degrees Fahrenheit. Once dry, the wood sample was placed into a 25% ortho-phosphoric acid solution at 140 degrees Fahrenheit for 5 minutes. The wood sample was then removed from the acid solution and rinsed with cool tap water to wash off the excess acid. The wood was then left to dry for 2 more hours. Once dry, the sample was slightly darker in appearance. No other surface changes were visible.

The heat and flame resistance of the wood sample was tested as follows: The treated wood sample and untreated sample were exposed to an acetylene flame which burns at a temperature between 2,000-2,500 degrees Fahrenheit. The treated and untreated samples were exposed to the flame for one minute. Within seconds, of being exposed, the untreated sample, burned continuous with visible flame and smoke. Burning continued for approximately ten minutes. With the treated sample, combustion occurred within seconds after being exposed to the flame. After removing the flame however combustion stopped within three seconds and after 15 seconds, no smoke was detected. After 30 seconds, the surface of the treated sample was slightly warm to the touch.

EXAMPLE 5

A typical method of treating a magnesium alloy surface using the invention is described as follows:

Three samples of magnesium panels were treated—all samples were a magnesium-nickel alloy measuring 4 inches (W)×6 inches (L)×0.041 inches thick. Samples 1-3 were first cleaned with a detergent and hot water to remove grease and oil and then immersed in a 25% (v/v) solution of ortho-phosphoric acid at 120 degrees Fahrenheit. This step provides magnesium ortho-phosphate to which the sodium silicate may bond. The samples were then rinsed with cool water and immersed in a 33% (v/v) 40 degree Fahrenheit sodium silicate solution for 5 minutes. The samples were then dried at 305 degrees Fahrenheit for 10 minutes to form a first layer of sodium silicate. The panels were allowed to cool to room temperature and then immersed in a 25% (v/v) solution of orthophosphate acid at 120 degrees Fahrenheit for 15 seconds (this step can vary from 15 to 45 seconds). During this step, an uniform, outer layer of silicon dioxide was formed on the surface exposed to the acid solution. The samples were then rinsed with cool water and re-immersed in the 33% sodium silicate solution. The samples were then dried at 305 degrees Fahrenheit for 30 minutes and allowed to cool to room temperature. The samples were then immersed in a 25% ortho-phosphate acid solution at 120 degrees Fahrenheit for 15 seconds forming a final layer of silicon dioxide. The samples were then rinsed with cool water and dried at 305% for 5 minutes to dry.

EXAMPLE 6

A typical method for treating nickel or nickel alloy surface using the invention is described as follows:

A sample of nickel plated tubing was treated—the sample was nickel plated measuring 12 inches (L) c ¼ inch (O.D.) and ⅛ inch side wall thickness. The sample was first cleaned with a detergent and hot water to remove grease and oil and then immersed in a 25% (v/v) solution of ortho-phosphoric acid at 120 degrees Fahrenheit. This step provides nickel ortho-phosphate to which the sodium silicate may bond. The sample was then rinsed with cool water and immersed in a 33% (v/v) 40 degree Fahrenheit sodium silicate solution for 5 minutes. The sample was then dried at 305 degrees Fahrenheit for 10 minutes to form a first layer of sodium silicate. During the drying process a portion of the sodium silicate was partially converted into silicon dioxide. The sample was allowed to cool to room temperature and immersed in a 25% (v/v) solution of orthophosphate acid at 120 degrees Fahrenheit for 15 seconds (this step can vary from 15 to 45 seconds). During this step, an uniform outer layer of silicon dioxide is formed on the surface exposed to the acid solution. The sample was then rinsed with cool water and re-immersed in the 33% sodium silicate solution. The sample was then dried at 305 degrees Fahrenheit for 10 minutes and allowed to cool to room temperature. The sample was then immersed in a 25% ortho-phosphate acid solution at 70 degrees Fahrenheit for 5 minutes forming a final layer of silicon dioxide. The sample was then rinsed with cool water and dried at 305% for 5 minutes to dry.

EXAMPLE 7

A typical method for treating silver or silver alloy surface using the invention is described as follows:

A sample of silver plated tubing was treated—the sample measured 12 inches (L) c ¼ inch (O.D.) and ⅛ inch side wall thickness. The sample was first cleaned with a detergent and hot water to remove grease and oil and then immersed in a 25% (v/v) solution of ortho-phosphoric acid at 120 degrees Fahrenheit. This step provides silver nitrate to which the sodium silicate may bond. The sample was then rinsed with cool water and immersed in a 33% (v/v) 40 degree Fahrenheit sodium silicate solution for 5 minutes. The sample was then dried at 305 degrees Fahrenheit for 10 minutes to form a first layer of sodium silicate. During the drying process a portion of the sodium silicate was partially converted into silicon dioxide. The sample was allowed to cool to room temperature and immersed in a 25% (v/v) solution of orthophosphate acid at 70 degrees Fahrenheit for 5 minutes (this step can vary from 2 to 7 minutes. During this step, an uniform outer layer of silicon dioxide is formed on the surface exposed to the acid solution. The sample was then rinsed with cool water and re-immersed in the 33% sodium silicate solution. The sample was then dried at 305 degrees Fahrenheit for 10 minutes and allowed to cool to room temperature. The sample was then immersed in a 25% orthophosphate acid solution at 70 degrees Fahrenheit for 5 minutes forming a final layer of silicon dioxide. The sample was then rinsed with cool water and dried at 305% for 5 minutes.

EXAMPLE 8

A typical method for treating titanium or titanium alloy surface using the invention is described as follows:

A sample of titanium plate was treated—the sample measured 3 inches (L)×3 inches (W) and 0.02 inches thick. The sample was first cleaned with a detergent and hot water to remove grease and oil and then immersed in a 10% (v/v) solution of ortho-phosphoric acid at 120 degrees Fahrenheit. This step provides titanium ortho-phosphate and titanium oxide which the sodium silicate may bond. The sample was then rinsed with cool water and immersed in a 33% (v/v) 40 degree Fahrenheit sodium silicate solution for 5 minutes. The sample was then dried at 305 degrees Fahrenheit for 10 minutes to form a first layer of sodium silicate. During the drying process a portion of the sodium silicate was partially converted into silicon dioxide. The sample was allowed to cool to room temperature and immersed in a 25% (v/v) solution of ortho phosphate acid at 70 degrees Fahrenheit for 5 minutes (this step can vary from 2 to 7 minutes. During this step, an uniform outer layer of silicon dioxide is formed on the surface exposed to the acid solution. The sample was then rinsed with cool water and re-immersed in the 33% sodium silicate solution. The sample was then dried at 305 degrees Fahrenheit for 10 minutes and allowed to cool to room temperature. The sample was then immersed in a 25% orthophosphate acid solution at 70 degrees Fahrenheit for 5 minutes forming a final layer of silicon dioxide. The sample was then rinsed with cool water and dried at 305 degrees for 5 minutes.

In compliance with the statute, the invention has been described in language more or less specific as to the steps required to practice the method. It should be understood, however, that the invention is not limited to the specific steps described herein, since they describe the preferred manner of putting the invention into practice. For example, other types of acids may be used to form the fixed surface on aluminum or to form an outer protective outer layer of sodium phosphate. Also, other types of silicate solutions may be used to form the protective layers of sodium silicate. The invention is therefore, claimed in any of its forms or modifications within the legitimate and valid scope of the appended claims properly interpreted in accordance with the doctrine of equivalents.

INDUSTRIAL APPLICABILITY

The method disclosed herein, will have wide application in industries which are concerned with protecting various types of metallic surfaces, including steel, copper, aluminum, and alloys thereof, and wood surfaces from corrosion, abrasion, fire and heat. More particularly, the method disclosed herein, will have wide application in the industries where the effects of corrosion, abrasions, fire and heat, are minimized. Also, the method disclosed herein, will have wide application in the fire prevention industries.

We claim:

1. A process of treating an article made of metal or wood, comprising the following steps:
   a. forming a fixed surface on said article;
   b. forming a plurality of layers of silicate salt over said fixed surface; and
   c. exposing a last of said layers of silicate salt to an acid solution to form an outer layer of silicon dioxide over said layers of silicate salt thereby forming a protective barrier on said article.

2. A process as recited in claim 1, wherein said acid solution is 20–30% phosphoric acid.

3. A process as recited in claim 2, wherein said phosphoric acid is heated between 120–140 degrees Fahrenheit and exposed to said last layer of silicate salt for 15 to 30 seconds.

4. A process as recited in claim 1, wherein said plurality of layers of silicate salt are formed by exposing said fixed surface to a silicate salt solution selected from the group consisting of potassium silicate, sodium silicate, lithium silicate, beryllium silicate, magnesium silicate, and calcium silicate, and then allowing said fixed surface to dry completely.

5. A process as recited in claim 4, wherein said sodium silicate solution is selected having a concentration of 18–33% (v/v).

6. A process as recited in claim 5, wherein each of said layers of sodium silicate is dried at a temperature and for a sufficient drying time so that a portion of said silicate in said layers of sodium silicate is converted into silicon dioxide.

7. A process as recited in claim 6, wherein said drying temperature is 302 degrees Fahrenheit or more and said drying time is at least 9 minutes.

8. A process as recited in claim 1, further comprising the step of exposing at least one of said plurality of layers of silicate salt, not including the last of said layers, to phosphoric acid to convert said layer of silicate salt into a bi-layer comprising an inner layer of silicate salt and an outer layer of silicon dioxide.

9. A process as recited in claim 1, wherein said article is made of metal selected from the group consisting of aluminum, copper, cadmium, magnesium, nickel, silver, steel, titanium, and their related alloys.

10. A process as recited in claim 9, wherein said fixed surface is formed on said article by thoroughly cleaning a surface of said article and then exposing said surface to a fixing acid solution.

11. A process as recited in claim 10, wherein said fixing acid solution is selected from the group consisting of acetic acid, boric acid, carbonic acid, hydrochloric acid, nitric acid, phosphoric acid, and sulfuric acid.

12. A process for treating the surface of an article made of metal or wood, comprising the following steps:
   a. forming a fixed surface on said article;
   b. exposing said fixed surface to a solution of sodium silicate;
   c. sufficiently drying said fixed surface until said sodium silicate is dried to form a layer of sodium silicate over said fixed surface;
   d. repeating steps (b) and (c) to form a plurality of layers of sodium silicate over said fixed surface;
   e. exposing a last of said layers of sodium silicate to phosphoric acid to form an outer layer of silicon dioxide over said fixed surface; and
   f. allowing said outer layer of said silicon dioxide to dry completely.

13. A process as recited in claim 12, wherein said article is made of metal and said fixed surface is formed thereon by cleaning the exposed surface on said article with water and detergent and then exposing said surface to phosphoric acid solution.

14. A process as recited in claim 13, wherein in step (b) said sodium silicate solution has a concentration of 18–33% (v/v).

15. A process as recited in claim 14, wherein in step (c) said drying of each said layer of sodium silicate is at 302 degrees Fahrenheit or more and for at least 9 minutes.

16. A process as recited in claim 15, wherein in step (e) the concentration of said phosphoric acid is 20–25% and the length of said exposure to said to said phosphoric acid is 15 to 30 seconds.

17. A process as recited in claim 12, further comprising the step of treating each of said layers of sodium silicate with a phosphoric acid solution to create a bi-layer comprising an inner layer of sodium silicate and an outer layer of silicon dioxide.

18. A process for treating the surface of an article made of metal, comprising the following steps:
   a. cleaning said surface of said article;
   b. exposing said surface to a 20–25% phosphoric acid solution for three to ten minutes, thereby forming a fixed surface;
   c. removing excess acid and impurities from said fixed surface;
   d. exposing said fixed surface to a 18–33% solution of sodium silicate;
   e. drying said fixed surface completely at at least 302 degrees Fahrenheit for at least 9 minutes to form a layer of sodium silicate over said fixed surface;
   f. repeating steps (d)–(e) to form a plurality of layers of sodium silicate over said fixed surface;
   g. exposing a last of said layers of sodium silicate to a solution of 20–25% phosphoric acid for 15–30 seconds; and
   h. rinsing the last layer of sodium silicate in water and allowing said article to dry.

* * * * *